United States Patent
Taylor et al.

(10) Patent No.: US 8,091,789 B2
(45) Date of Patent: Jan. 10, 2012

(54) BARCODE IMAGING SYSTEM AND SOURCE OF ELECTROMAGNETIC RADIATION THEREFOR

(75) Inventors: Michael Taylor, Dundee (GB); Grant McNicoll, Angus (GB)

(73) Assignee: NCR Corporation, Duluth, GA (US)

( * ) Notice: Subject to any disclaimer, the term of this patent is extended or adjusted under 35 U.S.C. 154(b) by 991 days.

(21) Appl. No.: 12/004,355

(22) Filed: Dec. 20, 2007

(65) Prior Publication Data

US 2009/0159686 A1 Jun. 25, 2009

(51) Int. Cl.
*G06K 7/10* (2006.01)
(52) U.S. Cl. .............. 235/462.43; 235/454; 235/462.01; 235/462.25; 235/462.45; 235/472.01
(58) Field of Classification Search .................. 235/425, 235/439, 454, 462.01, 462.43, 462.45, 472.01, 235/435, 462.25, 462.28, 462.42
See application file for complete search history.

(56) References Cited

U.S. PATENT DOCUMENTS

| | | | | |
|---|---|---|---|---|
| 5,992,746 A * | 11/1999 | Suzuki | ...................... | 235/462.21 |
| 6,299,329 B1 * | 10/2001 | Mui et al. | ...................... | 362/227 |
| 6,681,994 B1 * | 1/2004 | Koenck | ...................... | 235/472.01 |
| 7,296,743 B2 * | 11/2007 | Giebel et al. | ................... | 235/454 |
| 7,835,038 B2 * | 11/2010 | Razavi | .......................... | 358/475 |

* cited by examiner

*Primary Examiner* — Thien M. Le
*Assistant Examiner* — April Taylor
(74) *Attorney, Agent, or Firm* — Michael Chan

(57) ABSTRACT

A barcode imaging apparatus includes a source of electromagnetic radiation and an image acquisition device. The acquisition device is configured to be sensitive to a wavelength of electromagnetic radiation emitted by the source of electromagnetic radiation. In use, a bar code to be read is illuminated by the source of electromagnetic radiation and an image of the barcode is captured by the image acquisition device at the wavelength of that radiation. The source of electromagnetic radiation includes a Light Emitting Diode (LED), a Current Source, a Driver for the current source, a Clock Pulse Generator, and a Monostable. The LED is powered by the Current source which is in turn driven by the Driver which is controlled by the Clock Pulse Generator through the Monostable.

18 Claims, 3 Drawing Sheets

BARCODE IMAGING SYSTEM AND SOURCE OF ELECTROMAGNETIC RADIATION THEREFOR

TECHNICAL FIELD

The present invention relates to a barcode imaging system and a source of electromagnetic radiation therefor. It is particularly related to, but in no way limited to, a barcode reading system for an Automated Teller Machine (ATM).

BACKGROUND

Automated Teller Machines (ATMs) may be utilized to provide services in addition to the conventional one of supplying currency. For example, ATMs may allow users to pay bills. To enable this, certain information relating to the bill to be paid must be transferred to the ATM, for example the company to whom payment should be made and the amount to be paid. That information could be entered by the user, but a more convenient method is to read a barcode containing that information printed on the bill. The use of automated barcode reading simplifies the process for users and enables ATM machines to provide an improved service to their customers.

Barcodes are machine-readable patterns formed of contrasting areas which represent information. Common forms of barcodes may contain information in either one dimension or two dimensions. Single dimensional barcodes are formed of a set of parallel lines of varying width and spacing, which width and spacing encodes information into the barcode. Two dimensional barcodes are generally square or rectangular in outline and contain a pattern of contrasting areas which represent the information.

A convenient method of reading single-dimensional barcodes is to scan a narrow light source, for example a laser beam across the barcode, and to detect the lines of contrast as the beam moves across the barcode. This is the method commonly used in commercial barcode reading apparatus, for example those used in shop point of sale systems for reading barcodes on products. Two dimensional barcodes cannot be read using this laser technique as it is not, possible to scan the beam over the code in a sufficiently simple manner to obtain all of the required information.

An alternative technique of reading barcodes is to capture a digital image of the barcode using, for example, a CCD array, and process that image to identify the barcode area and decode the information represented by the barcode. This technique allows two dimensional barcodes to be read, but relies upon the ability to acquire a sufficiently detailed and illuminated image of the barcode.

A requirement of reading barcodes by processing an image is that the illumination over the area of the barcode is relatively constant, and in particular that there are no sharp changes in illumination over the area of the barcode. Such sharp changes can result in the confusion of lines in the barcode with the change in illumination thereby preventing correct decoding. Furthermore, a change in illumination across the barcode, combined with limitations in the contrast capability of the CCD, may prevent a sufficiently clear image being obtained of the whole barcode. For example, the area of the barcode with higher illumination may be washed out when the exposure is correct for the less illuminated part, and vice-versa. Scanning laser-based readers do not suffer from this problem since the light source is sufficiently bright to overcome any ambient light.

In order for automated reading of barcodes to be feasible, the read accuracy must be very high, and must be sufficiently simple to use that users can easily make use of the facility. Furthermore, since ATMs are located in uncontrolled environments, they must meet all relevant safety standards for apparatus accessible by the public. The use of laser-based barcode readers is therefore restricted as the bright light source of the laser is a safety hazard. Barcode readers in ATMs therefore utilize the image processing method.

ATMs may be located both indoors and outside, and therefore under both artificial and natural light of widely varying intensity. Furthermore, the illumination across a barcode can vary significantly due to shadows being cast across the barcode, for example due to the user's shadow falling on part of the barcode. The variation in illumination may be such that conventional CCD reading systems cannot read barcodes in all conditions, which is not acceptable as the services provided by ATMs must be operable the vast majority of the time.

The reading of barcodes by an ATM is a relatively unique problem since the system is subject to restrictions on the type of reader that can be used, and also the environment in which the ATM is located is almost totally uncontrolled. There is therefore a requirement for an improved barcode reading system capable of reading barcodes in a wide variety of lighting environments.

There are also practical considerations and problems which arise in implementing a light source suitable for the aforementioned barcode imaging system. In particular, while the IR illumination improves the read performance of barcodes on certain materials, barcodes on other materials are read more successfully without the illumination. For example, if the barcode is provided on thermal paper the IR illumination may degrade the image and cause reading of the barcode to be more difficult.

In addition, the LEDs in the illumination array are high brightness and narrow beam angle and are therefore subject to LASER safety legislation. The LEDs can not exceed LASER class 1 safety limits and it is a further requirement of this legislation is that the system will remain within the safety limits even under a single component failure condition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with a first aspect of the present invention there is provided a source of electromagnetic radiation comprising: at least one Light Emitting Diode (LED), a Current Source; a Driver for said current source; a Clock Pulse Generator; and a Monostable; the at least one LED being powered by the Current source which is in turn driven by the Driver which is controlled by the Clock Pulse Generator through the Monostable.

According to a second aspect of the present invention there is provided a barcode imaging apparatus, comprising a source of electromagnetic radiation; and an image acquisition device, configured to be sensitive to a wavelength of electromagnetic radiation emitted by the source of electromagnetic radiation, wherein in use, a bar code to be read is illuminated by the source of electromagnetic radiation and an image of the barcode is captured by the image acquisition device at the wavelength of that radiation; the source of electromagnetic radiation comprising; at least one Light Emitting Diode (LED), a Current Source; a Driver for said current source; a Clock Pulse Generator; and a Monostable; the at least one LED being powered by the Current source which is in turn driven by the Driver which is controlled by the Clock Pulse Generator through the Monostable.

Preferably the source of electromagnetic radiation further comprises a current sensor, the output of which is coupled to an input of the Monostable. More preferably, the current sensor is arranged to detect the operational status of an external device. Most preferably, the external device is a barcode reader.

The source of electromagnetic radiation further comprises a second Current Source arranged in series with the Current Source and the at least one LED. In a preferred embodiment the second Current Source is driven through a second Driver which is coupled directly to the Clock Pulse Generator.

The Clock Pulse Generator has a duty cycle of approximately 50%.

The at least one LED is an Infra Red LED and more preferably the source of electromagnetic radiation comprises a plurality of strings of LEDs. Most preferably the source of electromagnetic radiation further comprises a visible light LED which is arranged to indicate when the at least one LED is operating.

In a preferred embodiment the barcode imaging apparatus further comprises an image processing apparatus connected to the image acquisition device, configured to extract information contained in a barcode in an image captured by the image acquisition device.

Preferably the barcode imaging apparatus further comprises a filter located in the optical path between the image acquisition device and the area whose image is captured thereby, wherein the filter passes the wavelength emitted by the source of electromagnetic radiation and attenuates other wavelengths.

In a preferred embodiment the source of electromagnetic radiation is configured to turn on and off during reading of a barcode.

Many of the attendant features will be more readily appreciated as the same becomes better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawing, in which.

DETAILED DESCRIPTION

Embodiments of the present invention are described below by way of example only. These examples represent the best ways of putting the invention into practice that are currently known to the Applicant although they are not the only ways in which this could be achieved.

Barcode Imaging Apparatus

A barcode imaging apparatus is herein described with reference to FIGS. 1 and 2.

In order to accurately read barcodes using CCD arrays in an ATM a relatively constant level of illumination must be provided over the area of the barcode. This must be provided independently of the ambient lighting conditions of the ATM, for example natural or artificial light. A particular problem occurs due to shadows being cast over the area of the barcode.

It has been observed that when an ATM is located outside, the luminance on a barcode to be read may vary between around 19,000 and 39,000 lux, or even be as high as 100,000 lux when exposed to direct sunlight. Luminance levels under artificial lighting may vary between about 400 & 600 lux but is highly dependent on lighting types and exposure to natural outdoor light. Shadows cast across a barcode can dramatically change the luminance, and may reduce it to between 500 and 700 lux. Contrast ratios across the area of a barcode may therefore exceed 150:1, or typically be around 50:1. Such contrast ratios prevent the CCD being able to obtain a sufficiently illuminated image of the whole barcode area and therefore reading of barcodes may not be possible when a shadow falls across the area.

In order to improve the image captured by the CCD it is possible to provide artificial illumination of the barcode to reduce the contrast over the area of the barcode. For example, such illumination may be provided generally over the area of the barcode, or focused particularly onto the barcode. The use of high-power LEDs may enable the luminance level in a shadowed area of the barcode to be increased to around 3,000-4,000 lux, thereby reducing the contrast ratio to around 10:1, which may be sufficiently low to read a barcode using a CCD array. However, this solution presents significant problems.

In order to provide a sufficiently high luminance, a relatively high power light source is required. For example, three 3 W LEDs may provide sufficient illumination. The use of such high-power sources presents a number of problems. The size of such units is substantial and their fitment in ATMs is difficult. The luminance required to read the barcode is very high and leads to unpleasant glare when they are switched on. Also, the brightness of the illumination is such that any guide markings or illumination explaining to the user where to position the barcode become unreadable by the user, thereby reducing the usability of the ATM.

Figure 1:
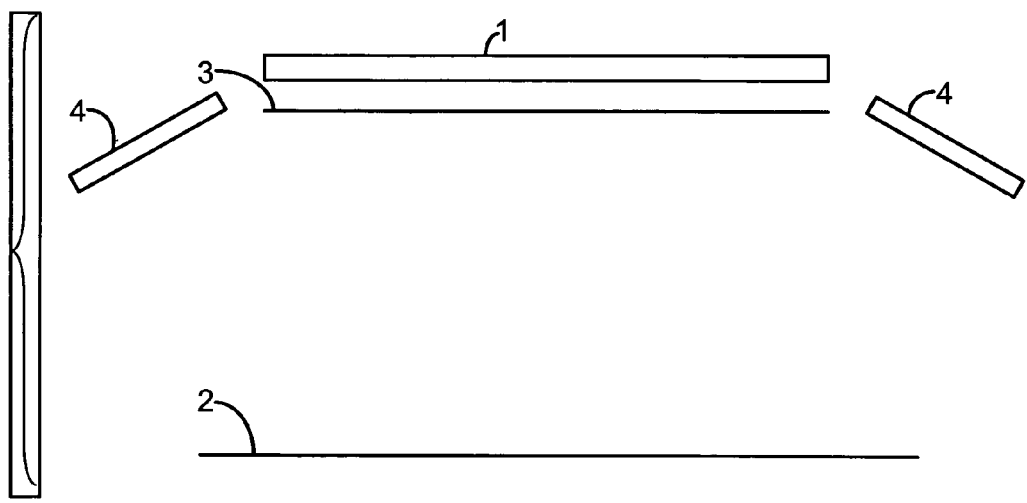
FIG. 1 is a schematic diagram of a barcode imaging system in accordance with an embodiment of the present invention.

FIG. 1 shows an embodiment of a barcode reading system for use in an ATM to overcome the difficulties of reading barcodes with uncontrolled illumination. A two dimensional CCD array 1, or other image acquisition device, is arranged to capture images of the area 2 in which barcodes will be presented for reading. An Infra Red (IR) filter 3 is positioned in front of the CCD array, which filter allows IR wavelengths to pass, but attenuates other wavelengths. IR emitting LEDs 4 are arranged to illuminate the barcode reading area with IR light. In an exemplary embodiment the CCD array is spaced between around 14 cm and 22 cm from the expected location of the barcode to be read.

To read a barcode positioned in the reading area 2, the barcode is illuminated by the IR LEDs and an image of the barcode at IR wavelengths is captured by the CCD array. That image is then processed using normal methods to decode the information in the barcode.

This embodiment overcomes the shadowing problems of the prior art since the barcode is evenly illuminated by the LEDs, therefore enabling a clear, even image to be acquired by the CCD. Furthermore, the IR content of ambient light, both artificial and natural is relatively low, and so the luminance required at IR wavelengths to overcome variations in ambient light illumination, is significantly lower than when visible light is used to illuminate the barcode. Additionally, since IR wavelengths are not visible to the human eye, no glare problems are created even if the luminance is very high.

It has been observed that when the barcode is imaged using IR wavelengths a barcode can be read even when there is a contrast ratio of over 200:1 in the luminance at visible wavelengths across the area of the barcode.

Certain types of printing techniques produce printed barcodes that are not visible at IR wavelengths. For example, thermal paper absorbs IR wavelengths and therefore a barcode printed on thermal paper is not visible at those wavelengths. In order to read barcodes printed using various techniques, the IR LEDs illuminating the barcode are repeatedly turned on and off, and images of the barcode captured in both circumstances. This allows barcodes visible under IR wavelengths to be read with improved accuracy, but still allows reading of barcodes that are not visible under IR by use of the images captured during the period when the IR LEDs are off. In an exemplary embodiment a cycle rate of between 2 Hz and 4 Hz may be utilized. A further advantage of cycling LEDs on and off is that the peak output power may be increased, thereby increasing the luminance on the barcode.

The capture of images from the CCD may be synchronized with the LEDs such that some images are captured when the LEDs are on, and some when they are off. Alternatively, the LEDs may be turned on and off faster than the CCD capture rate such that a single image contains information at both the IR and visible wavelengths. The IR filter of the first embodiment may be omitted to allow the capture of both visible and IR images, and furthermore the CCD must be sensitive in both IR and visible wavelength ranges.

Figure 2:
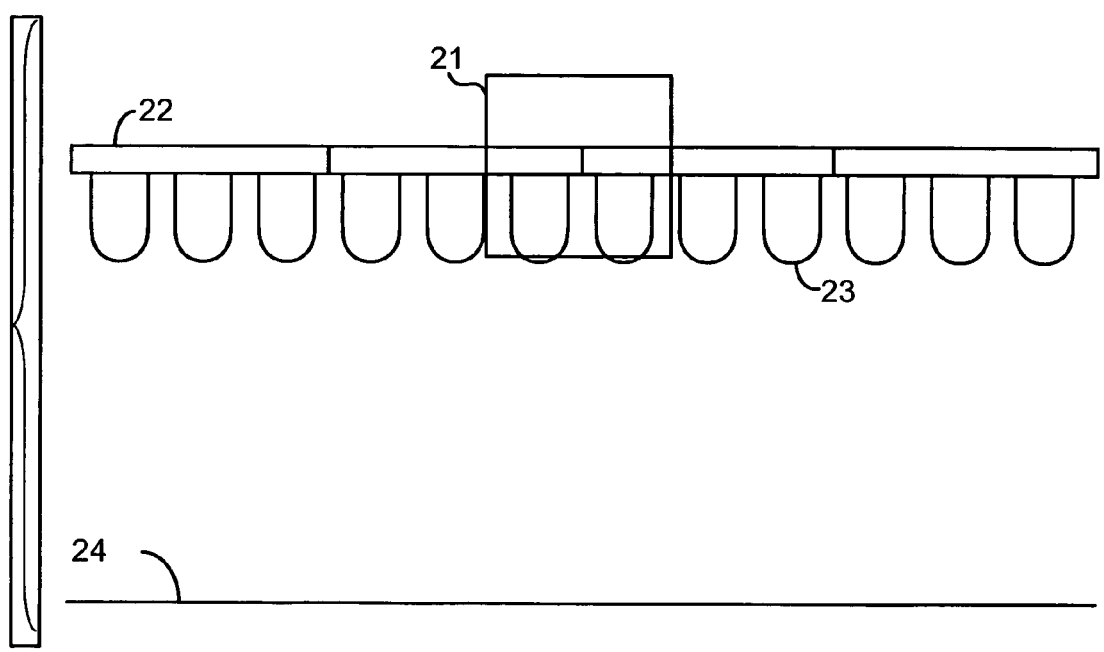
FIG. 2 is a schematic diagram of an embodiment of the invention.

FIG. 2 shows a second embodiment. A CCD 21 and an array 22 of Infra Red LEDs 23 are provided to image a barcode in reading area 24. The LED array may be one or two dimensional, depending upon the area which requires illumination. In this embodiment no Infra-Red filter is provided and therefore all wavelengths of electromagnetic radiation fall on the CCD and will be detected dependent upon the CCD's sensitivity at each wavelength. The CCD is mounted in front of, or behind, the LED array, in contrast to the embodiment of FIG. 1 in which LEDs are mounted either side of the CCD. In FIGS. 1 and 2 the barcode will be read most efficiently if its longer axis runs left to right along the figure, rather than being perpendicular to the page. The arrangement of FIG. 2 may give a more even illumination of the barcode, thereby improving read accuracy. In alternative embodiments the CCD may be mounted within the array such that the CCD is surrounded by LEDs.

In addition to the use of IR other non-visible wavelengths of electromagnetic radiation may be used. For example, ultraviolet wavelengths could be utilized. Provided that the ambient light has a relatively low content at the wavelength in question, the advantages described above will be provided. The use of other non-visible wavelengths may also overcome other difficulties, for example barcodes printed on thermal paper may also be visible under different wavelengths. As will be apparent to the person skilled in the art, the imaging device must be sensitive at the appropriate wavelengths. In addition to the non-visible illumination, visible illumination may also be provided.

The imaging device, for example the CCD array, may be mounted within an ATM behind a transparent window. That window may also provide the filtering function described above, or that filter may be provided separately.

The LEDs may be mounted in the surface of an ATM fascia, or may be located behind a transparent window within the ATM. The LEDs may be configured to directly illuminate the barcode, or a lens system may be provided to focus the light into the required area. LEDs are described herein as the source of the light as they provide low-cost, high-reliability light source, but as will be apparent to the person skilled in the art any light source providing light at the appropriate wavelengths may be utilized.

The barcode reading area may be indicated by markings on the fascia of the ATM, by instructions provided on the ATM screen or by other means. For example, an area may be illuminated by a visible light source to indicate where the barcode should be positioned for reading.

The configuration of the IR, or other wavelength, source depends upon the particular implementation in which it is used. For example, a plurality of LEDs may be utilized to obtain the power and area of illumination required, or alternatively single LED may be utilized with or without a lens system.

References to "wavelength" herein are not intended to limit the radiation to a single wavelength, but rather to define the general wavelength region of the radiation.

Any range or device value given herein may be extended or altered without losing the effect sought, as will be apparent to the skilled person.

Source of Electromagnetic Radiation

Figure 3:
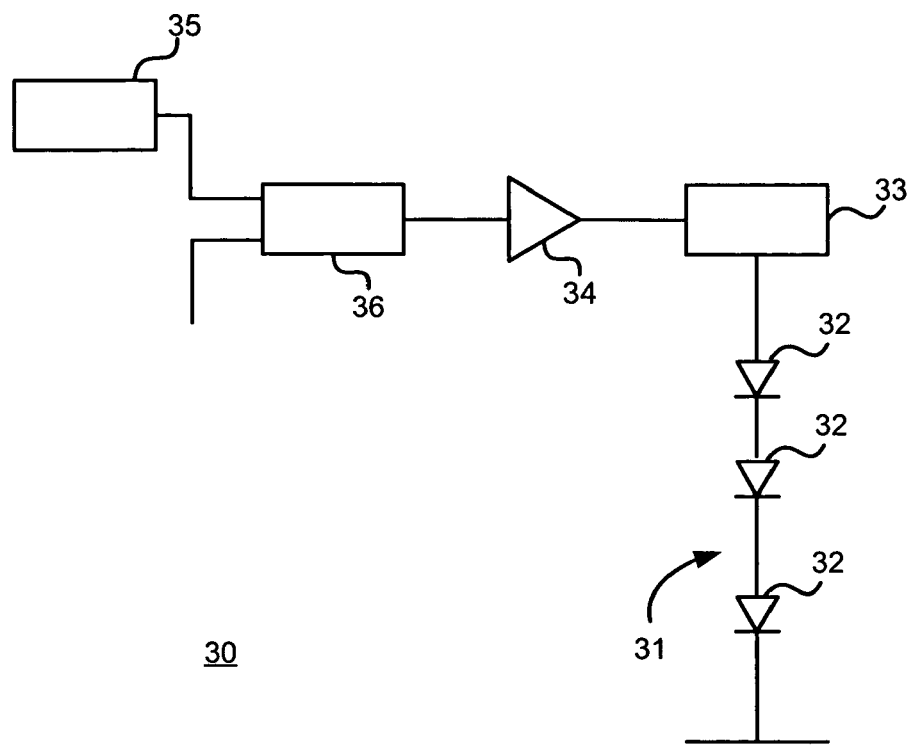
FIG. 3 is a diagram of a light source in accordance with an embodiment of the present invention.
Figure 4:
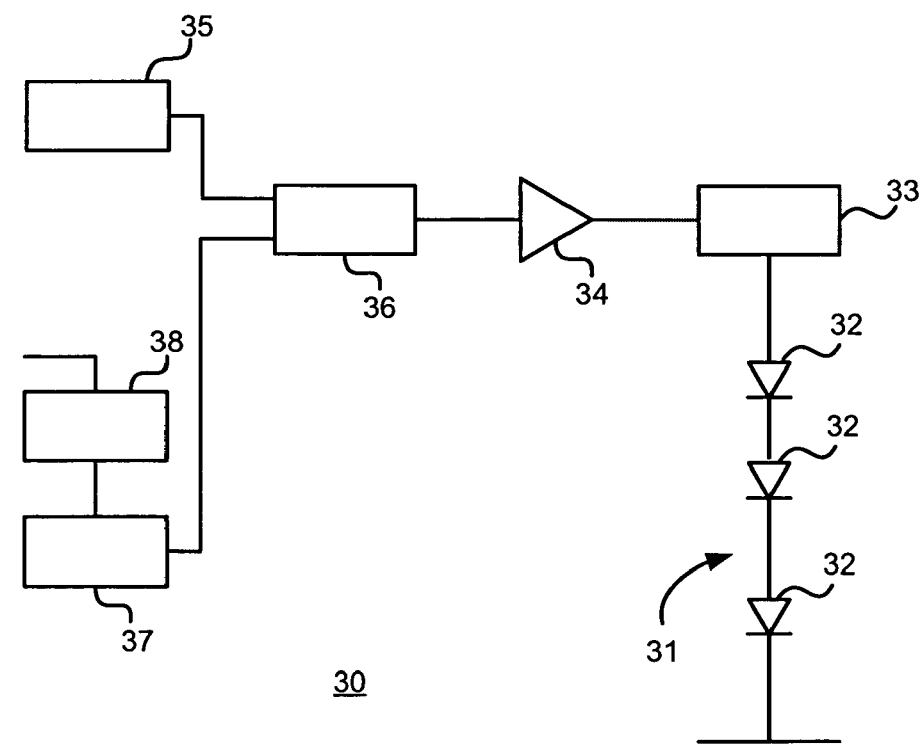
FIG. 4 is a diagram of an improved version of the light source of FIG. 3.
Figure 5:
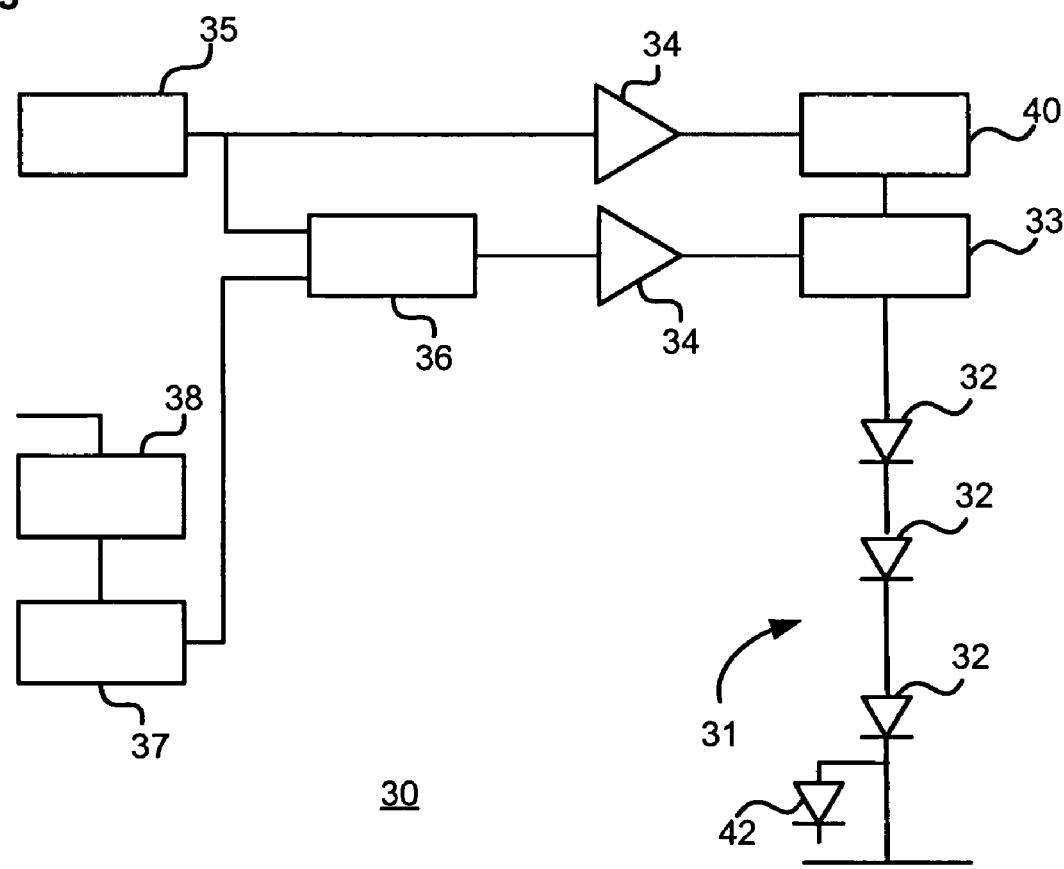
FIG. 5 is a diagram of a still further improved version of the light source of FIG. 3.

A source of electromagnetic radiation, suitable for use in a barcode imaging system as described above, will now be detailed, with reference to FIGS. 3 to 5.

FIG. 3 illustrates a source of electromagnetic radiation 30 comprising: an LED array 31 consisting of a number of strings of series-connected high-brightness narrow-beam infra-red LEDs 32. OSRAM SFH 4550 High Power Infra Red Emitters (850 nm) would be suitable. Each string 31 of LEDs 32 is fed from a separate current source 33 each of which is set to a preset current value. Each Current Source 33 is driven by an individual Driver 34, the combination being provided by, for example, an "ON" Semiconductors NUD 4001 High Current LED Driver.

A Clock Pulse Generator 35, such as a Texas Instruments TLC555 Timer configured as free running oscillator, is coupled to each Driver 34 through a Monostable 36, such as a Philips Semiconductors 74HC/HCT4538 Dual Re-triggerable Precision Monostable Multivibrator.

The LEDs 32 are powered by Current Sources 33 each of which is driven in turn by the Drivers 34 the outputs of which are controlled by the Clock Pulse Generator 35 through the Moriostable 36.

As is illustrated in FIG. 4, the source 30 includes a sensor 37 that senses the current passing through the barcode reader assembly 38 thereby determining when the reader is in image capture mode. A Zetex ZXCT 1030 High-Side Current Monitor would be suitable. This sensor enables the Monostable only when a barcode image is to be captured thereby extending the life of the LEDs.

Failure of any one of the Current Sources 33 could allow excessive current to be fed to the LEDs.32 resulting in an unsafe level of illumination. A second Current Source 40 with an identical preset current value is therefore connected in series with the first Current Source 33 in each LED string 31.

Failure of either Current Source 33, 40 in a short circuit or over-current mode will result in the other Current Source regulating the current to the pre-determined safe level in each string 31. The Current Sources 33, 40 devices are controlled from independent drive circuits. The drive circuits are both driven from a free running Clock Pulse Generator 35, as detailed above, with a duty cycle of approximately 50%.

This arrangement also provides illuminated and non-illuminated periods to capture the barcode image. One of the Current Sources, in this embodiment the second Current Source 40 is driven directly from the Clock Pulse Generator 35 whilst the other Current Source is driven indirectly through Monostable 36. The Monostabe 36 has an on period equal to half the clock period. This provides a safety timeout in the case of a clock failure.

The source 30 also includes a diagnostic visible LED 42, per string, to indicate when each of the IR LED strings 31 is conducting current.

When in use to read a bar code an ATM, have a barcode imaging apparatus as described, herein operates as described below.

The process is initiated by user accessing the ATM and requesting the scanning of a bar code in a normal manner. The ATM control processor then actives the barcode reader in the normal manner, which is detected by the sensor 37 due to the increase in current in the barcode reader assembly 38. An output from the sensor 37 is coupled to an input of the Monostable 36 which causes the Monostable to provide a series of output pulses in response to the input pulses from the Clock Pulse Generator 35. The output of the Monostable 36 in turn is the input to the Driver 34 which in turn drives the Current Source 33. As the second Current Source 40 is driven directly from the Clock Pulse Generator 35 both Current Sources 33, 40 are active at the same time and the strings 31 of LEDs 32 are each activated.

If the Clock Pulse Generator 35 fails in an "ON" portion of its cycle the Monostable 36 will cease to produce an output and the LEDs will be switched off.

If either of the Current Sources 33, 40 suffers a failure that would result in an increased current to the LEDs, and hence an increase in the power of the output of the LEDs, the other Current Source will constrain the current in the string 31 to the preset safe current and no increase in LED power will be produced.

Finally once the barcode has been read and the ATM processor confirms this the current in the barcode reader assembly 38 is reduced which is sensed by the sensor 37 which will in turn cease to produce an output and the output of the Monostable will be switched off which will switch off the Current Sources 33 and hence the LEDs 32.

It will be understood that the benefits and advantages described above may relate to one embodiment or may relate to several embodiments. It will further be understood that reference to 'an' item refers to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A source of electromagnetic radiation comprising:
   at least one light emitting diode (LED);
   a first current source;
   a second current source arranged in series with the first current source and the at least one LED, wherein the first and second current sources co-operate to regulate current to the at least one LED in the event of failure of one of the first and second current sources;
   a first driver for the first current source;
   a second driver for the second current source;
   a monostable coupled to the first driver; and
   a clock pulse generator arranged to (i) control the first driver through the monostable and thereby to control the first current source to power the at least one LED and (ii) control the second driver and thereby to control the second current source to power the at least one LED.

2. The source of electromagnetic radiation of claim 1, further comprising a current sensor, the output of which is coupled to an input of the monostable.

3. The source of electromagnetic radiation of claim 2, wherein the current sensor is arranged to detect the operational status of an external device.

4. The source of electromagnetic radiation of claim 3, wherein the external device is a barcode reader.

5. The source of electromagnetic radiation of claim 1, wherein the clock pulse generator has a duty cycle of approximately 50%.

6. The source of electromagnetic radiation of claim 1, wherein the at least one LED is an infra red LED.

7. The source of electromagnetic radiation of claim 1, further comprising a plurality of strings of LEDs.

8. The source of electromagnetic radiation of claim 1, further comprising a visible light LED which is arranged to indicate when the at least one LED is operating.

9. A barcode imaging apparatus comprising:
   a source of electromagnetic radiation; and
   an image acquisition device, configured to be sensitive to a wavelength of electromagnetic radiation emitted by the source of electromagnetic radiation, wherein in use, a bar code to be read is illuminated by the source of electromagnetic radiation and an image of the barcode is captured by the image acquisition device at the wavelength of that radiation;
   the source of electromagnetic radiation comprising:
      at least one light emitting diode (LED);
      a first current source;
      a second current source arranged in series with the first current source and the at least one LED;
      a first driver for the first current source;
      a second driver for the second current source;
      a monostable coupled to the first driver; and
      a clock pulse generator arranged to (i) control the first driver through the monostable and thereby to control the first current source to power the at least one LED and (ii) control the second driver and thereby to control the second current source to power the at least one LED.

10. The barcode imaging apparatus of claim 9, further comprising a current sensor, the output of which is coupled to an input of the monostable.

11. The barcode imaging apparatus of claim 10, wherein the current sensor is arranged to detect the operational status of an external device in the form of a barcode reader.

12. The barcode imaging apparatus of claim 9, wherein the clock pulse generator has a duty cycle of approximately 50%.

13. The barcode imaging apparatus of claim 9, wherein the at least one LED is an infra red LED.

14. A barcode imaging apparatus according to claim 9, further comprising
   an image processing apparatus connected to the image acquisition device, configured to extract information contained in a barcode in an image captured by the image acquisition device.

15. A barcode imaging apparatus according to claim 9, further comprising a filter located in the optical path between the image acquisition device and the area whose image is captured thereby, wherein the filter passes the wavelength emitted by the source of electromagnetic radiation and attenuates other wavelengths.

16. A barcode imaging apparatus according to claim 9, wherein the source of electromagnetic radiation is configured to turn on and off during reading of a barcode.

17. A source of electromagnetic radiation comprising:
at least one light emitting diode (LED);
a first current source having a first preset current value;
a second current source having a second preset current value and arranged in series with the first current source and the at least one LED, wherein the first and second current sources co-operate to regulate current to the at least one LED in the event of failure of one of the first and second current sources;
a monostable coupled to the first current source; and
a clock pulse generator (i) coupled through the monostable to the first current source to control the first current source to power the at least one LED and (ii) coupled to second current source to control the second current source to power the at least one LED.

18. A source of electromagnetic radiation according to claim 17, wherein the second preset current value is substantially identical to the first preset current value.

* * * * *